Jan. 16, 1951 H. T. SAWYER 2,538,428
COMBUSTION BRILLIANCY CONTROL SYSTEM
Filed April 25, 1946 2 Sheets-Sheet 2

*INVENTOR.*
HAROLD T. SAWYER
BY
*ATTORNEY*

Patented Jan. 16, 1951

2,538,428

UNITED STATES PATENT OFFICE 2,538,428

COMBUSTION BRILLIANCY CONTROL SYSTEM

Harold T. Sawyer, Seattle, Wash., assignor to Bailey Meter Company, a corporation of Delaware Application April 25, 1946, Serial No. 664,753

3 Claims. (Cl. 236—14)

My invention relates to control systems and particularly to providing method and apparatus for controlling variables in the operation of power producing or utilizing apparatus responsive to a variable condition of the operation.

One object of my invention is to provide a control of one or more of the elements of combustion supplied to a fuel fired furnace for liberating heat. Preferably the rate of supply of one or more of such elements of combustion is controlled at least in part in accordance with a determination of brilliancy of the furnace. The said brilliancy may be of the flame, the gaseous products of combustion, the walls of the furnace or of a fuel bed in the furnace.

Figure 1:
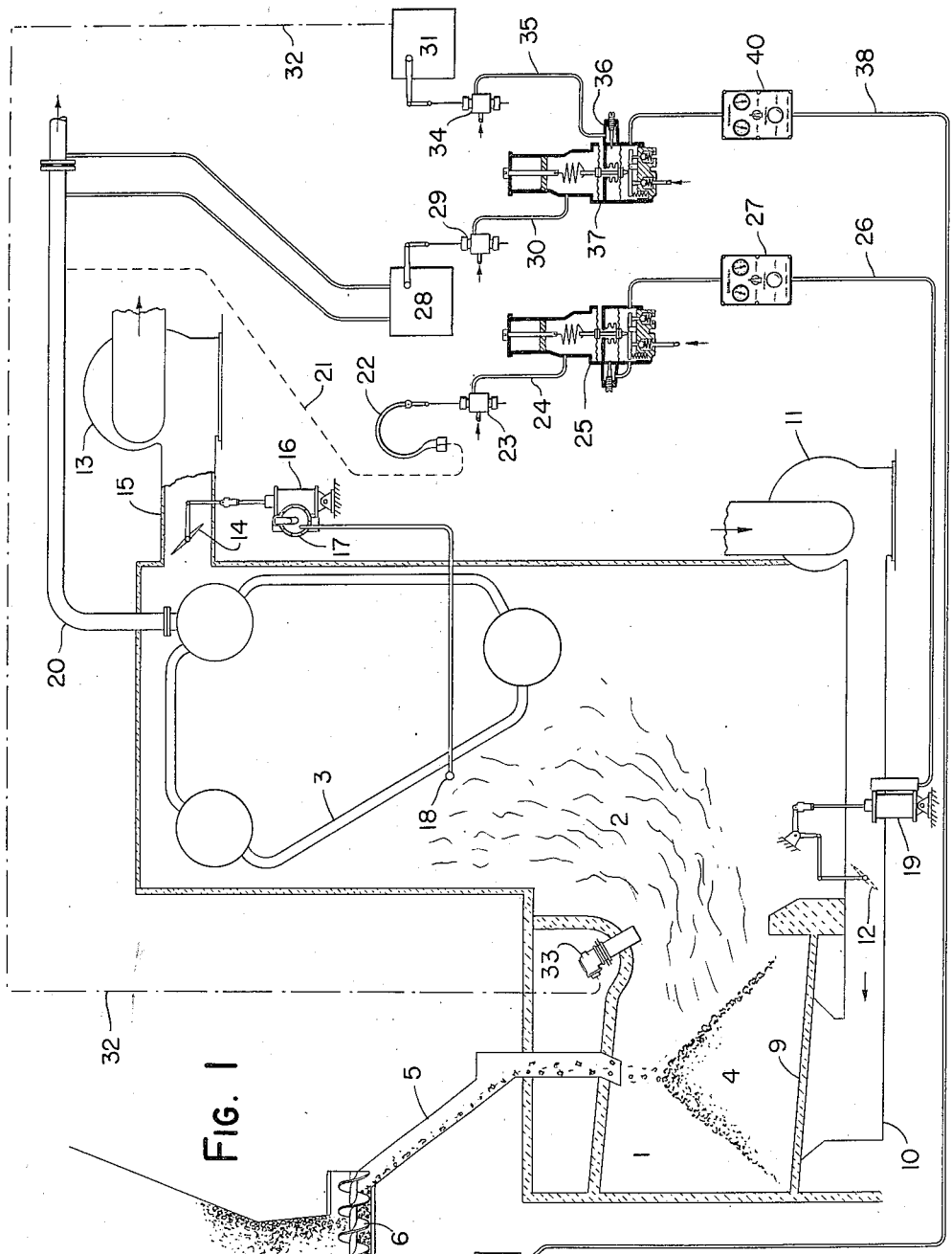
Fig. 1 is a diagrammatic showing of my invention embodied in a control system applied to a vapor generator furnace utilizing hog fuel.
Figure 2:
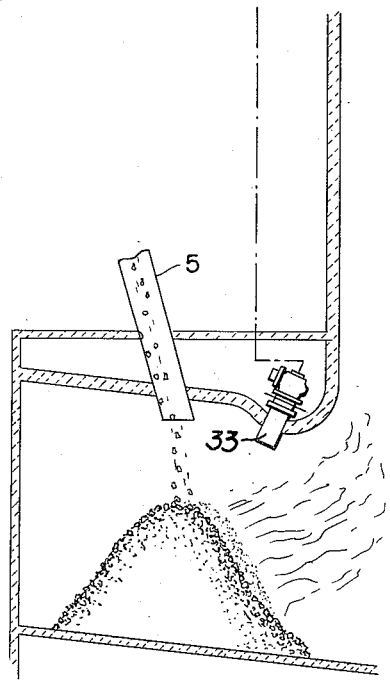
Fig. 2 shows a modification of a portion only of Fig. 1.
Figure 3:
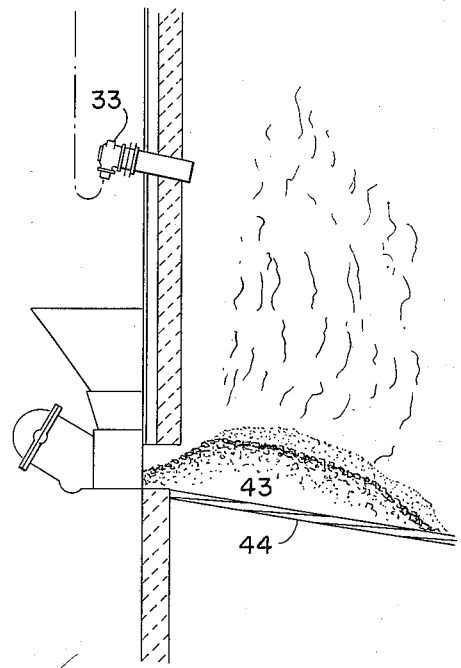
Fig. 3 illustrates a portion of Fig. 1 with my invention applied to a stoker-fired furnace.
Figure 4:
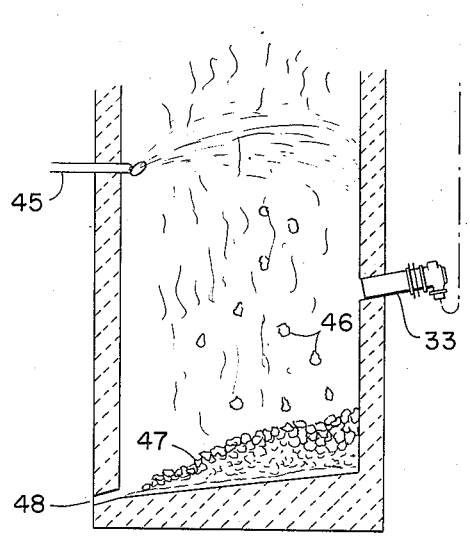
Fig. 4 shows a furnace for the smelting of black liquor.
Figure 5:
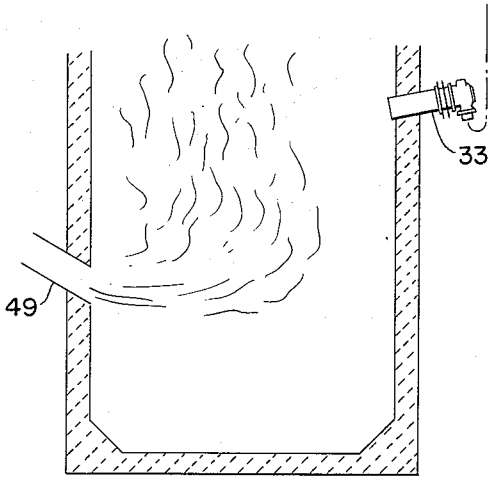
Fig. 5 illustrates the invention applied to a fluid fired furnace.

In Fig. 1, I have illustrated, in somewhat diagrammatic fashion, my invention applied as a control system to a vapor generating unit heated by the products of combustion of a solid fuel, such as wood waste products, commonly known as hog fuel. In the other drawings I have illustrated only a portion of the complete system, feeling that it is unnecessary to duplicate in each of the figures the elements of Fig. 1 which are common to all of the figures. Fig. 2 illustrates the furnace of Fig. 1 in which the brilliancy within the furnace is determined in a slightly different manner than in Fig. 1. In Figs. 3, 4 and 5 I illustrate somewhat different furnace structures and the utilization of solid, liquid or gaseous fuels to which the invention may be applied in a manner somewhat similar to that illustrated completely in Fig. 1, and which will be described in detail.

Referring now particularly to Fig. 1, I indicate at 1 a furnace of Dutch oven construction from which the hot products of combustion 2 pass to and through the gas passages of a vapor generator 3 for producing steam. Within the furnace 1 is a pile or cone of what is commonly termed hog fuel. Such fuel may be wood waste, bagasse, or the like. Wood products may be of varying sizes from sawdust to slugs or chips and bark. Fir, hemlock, spruce, shavings, bark and other varieties of waste wood fuel differ as to size, B. t. u. content, moisture content, etc. Bagasse is the term commonly given to the refuse of sugar cane, sugar beets, grapes, olives, etc. after the juice has been extracted.

Particular features or characteristics of this general classification of fuel provide problems peculiar thereto, such for example as wide variations in size and shape of the particles, of the moisture content, of the B. t. u. value, the volatility, ignition temperatures, etc. The lack of uniformity of these variables, even when supplying one particular fuel, presents problems in the control of the apparatus to which my invention is directed. All of the fuels mentioned, however, have substantially the same variable characteristics and form a class which I will hereafter refer to as hog fuel.

The hog fuel is continuously supplied at a controllable rate to the cone 4 through a spout 5 by a screw conveyor 6 driven by a motor 7 whose speed is controlled by a rheostat 8. The motor 7 might be a constant speed driving engine with a controllable variable speed reduction device between the motor and the screw 6.

As the hog fuel drops into the furnace 1 from the spout 5 it builds a pile or cone 4 having a slope determined by the angle of repose of the particular material. The base of the cone preferably completely covers the grates 9 through which is supplied forced air for combustion. This forced draft is available through a duct 10 from a constant speed forced draft fan 11 and the admission rate is varied through the agency of a controllable damper 12.

In normal operation combustion occurs principally over the surface of the cone. The interior of the cone will be composed of a mixture or of strata of ash, glowing embers and particles of the hog fuel in various stages of drying. As the raw fuel is dropped upon the apex of the cone and cascades down the outer surface it continually tends to submerge or cover layers or portions of the surface of partially consumed fuel. Such material continues to be dried or carbonized by the expelling of moisture and volatile material due to the passage of air upwardly through the cone, the application of heat thereto from the burning outer surface, as well as from the glowing or partly burning submerged particles. The vapors and gases so expelled pass outwardly through the surface of the cone where the volatiles are ignited and promote the combustion of the undried raw fuel continually falling on said outer surface. In normal operation the process is self-sustaining with the drying of the fuel and the combustion of the distillates and fixed carbon progressing.

For a uniform rate of fuel supply an increase in the application of forced draft through the grates 9 will tend to blow up the fire, not only through the additional percentage of free oxygen in the air, but also from the increased velocity thereof, providing better contact with the material and consequent scrubbing action and also providing better mixture with the distillates. Usually variation in rate of supply of forced draft is highly responsive and sensitive and may not be used as a primary control. In other words, if a control of the rate of supply of forced draft through the grate is depended upon to maintain desired steam outflow and steam pressure from the vapor generator, overshooting and hunting will occur, for relatively slight variations in such rate of said supply will produce a greater variation in the rate of heat liberation in the furnace. I have found that a control of the rate of supply of forced draft must therefore be of a secondary nature and not preferably be the primary control of the output of the vapor generator.

On the other hand, for a relatively uniform rate of supply of forced draft, a decrease in the rate of supply of raw fuel will allow the cone height to decrease and shortly the resistance thereof to passage of forced draft will decrease with consequent blowing of holes through the cone and progressively poorer operation. An increase in the rate of supply of hog fuel will tend to submerge the surface of the cone with a relatively green or wet blanket, tending to smother the fire, resulting in smokiness, a darkened furnace and general cooling of the entire furnace. Obviously this can be carried to the extreme where the fire is completely smothered out by the green, moist hog fuel.

At a substantially uniform desired steam pressure the rate of steam outflow is representative of the demand or of the rate of heat output of the vapor generator. Desirably the rate of heat input to the generator (from the furnace) should correspond to the rate of heat demand.

Preferably then, I control the rate of supply of hog fuel to the furnace primarily in accordance with the rate of vapor outflow from the generator. Such control, however, is not the complete answer, for each cubic foot of hog fuel supplied will vary somewhat as to density, moisture content, B. t. u. value, volatility, mixed carbon, etc. Each of these variables contribute to the extent to which the enveloping surface of raw fuel tends to smother or darken the combustion about the outer surface of the cone. I have found that even though feeding continuously a single class of fuel, such for example as fir refuse, the minute by minute variation in size, moisture content, etc. produce variations in the smothering effect. For example, the fir hog fuel may vary in size from sawdust to large chips or chunks. The moisture content and volatizing characteristics will vary between wood and bark particles, while the B. t. u. content per cubic inch solid will vary between wood knots, bark and other portions of the supply. Thus even a continuous indication (such as speed of a screw conveyor) of the volumetric rate of supply of raw fuel is not a complete representation of the B. t. u. and burnability of the fuel. I have found that an index of the smothering of the cone is the most desirable guide to modify or supplement a primary control of rate of fuel feed. Such an indication is the brilliancy of the surface of the cone or of the products of combustion leaving the cone.

The smothering effect of the raw fuel over the surface of the cone varies the brilliancy of said surface. The varying amount of moisture, smoke, etc., in the flame and gases leaving the cone varies the brilliancy thereof. For certain installations or for certain fuels a response to brilliancy of the cone surface is preferable, while under other conditions a response to brilliancy of the flame or products of combustion leaving the cone is preferable.

Regardless of the origin of the brilliancy variable I desirably utilize it as a modifying control in conjunction with a primary control in accordance with demand upon the unit. Specifically, I primarily utilize rate of steam outflow from the vapor generator as a primary control, modified by a measure of brilliancy within the furnace, to conjointly effect a control of the rate of supply of raw hog fuel to the furnace.

Referring specifically to Fig. 1, I illustrate therein a complete control system for the furnace and vapor generator embodying the following functions:

1. A control of the induced draft (rate of discharge of products of combustion from the furnace and vapor generator) in accordance with a determination of the pressure at a preselected location in the unit. This is commonly termed furnace draft control and serves to minimize infiltration of air through the setting or leakage of gaseous products outwardly through the setting.

2. A control of the rate of air admission through the grates in accordance with pressure of the steam leaving the vapor generator.

3. A control of the speed of the screw feeder 6 and thereby a control of volumetric rate of supply of hog fuel to the furnace, conjointly from a continuous determination of rate of vapor outflow (representative of demand upon the unit) and from brilliancy at a preselected location within the furnace.

I indicate at 13 a constant speed induced draft fan drawing the products of combustion from the unit and discharging them to a stack or otherwise. Control of the rate of flow of such products of combustion from the furnace is had by a positioning of a damper 14 in an outlet duct 15. The damper is arranged to be positioned by a pneumatic controller 16 having a diaphragm 17 sensitive to the furnace draft or pressure at a selected location, for example 18, within the unit. The location 18 is usually one at which it is desired to maintain substantially atmospheric pressure through the control of rate of suction of the gaseous products through the duct 15 in accordance with rate of supply of said gaseous products from the furnace 1. Such control provides a unitary system with usual adjustable features wherein the furnace draft may be continuously maintained as desired.

In control of the rate of supply of air for combustion through the positioning of the damper 12 I indicate a pneumatic controller 19 responsive to a continuous measure of pressure of the steam leaving the generator 3. Connected to the steam outflow main 20 is a pipe 21 communicating with the interior of a Bourdon tube 22 which is arranged to position the movable element of a pilot valve 23, thereby establishing a loading pressure in the pipe 24 continuously representative of the value of steam pressure. The elements are adjustable in known manner so that a given range in steam pressure values may result in a predetermined range in loading pressures in the pipe 24. Preferably this control is relatively insensitive, for as previously mentioned the combustion of the cone within the furnace 1 is quite sensitive to variations in rate of supply of air through the grate 9. Thus preferably only relatively small variations in rate of air admission are made for given variations in steam pressure, but such relation is adjustable and may vary with different sets of conditions.

The loading pressure within the pipe 24 is applied to a standardizing relay 25 of the type disclosed and claimed in the patent to Gorrie Re. 21,804, continuously establishing a control pressure in the pipe 26 leading to the pneumatic controller 19. Superimposed in the pipe 26 is a selector valve 27 providing the possibility of removing control of the damper 12 from automatic response to steam pressure variations and allowing remote manual positioning of said damper if desired.

I indicate at 28 a steam flow meter continuously responsive to the weight rate of flow of steam discharged through the conduit 20 to any point of usage. The meter 28 is arranged to position the movable element of a pilot valve 29, thereby continuously establishing in a pipe 30 an air loading pressure representative of the weight rate of vapor leaving the vapor generator and thus continuously representative of the B. t. u. demand upon the unit.

At 31 I indicate a brilliancy meter connected by the necessary electrical leads 32 with a sighting arrangement 33. The sight 33 is (in Fig. 1) preferably shown as sighting through the flame and gaseous products of combustion leaving the Dutch oven 1. However, under certain conditions it may be preferable to sight the unit 33 directly at the surface of the cone 4 or at the walls of the furnace (Fig. 2). In any event the sighting unit 33 includes a photo-voltaic cell sensitive to brilliancy at a predetermined site within the combustion chamber and continuously establishing a direct current E. M. F. representative of a measure of brilliancy at desired location.

The brilliancy meter 31 is of known type, sensitive to a small value direct current for positioning the movable element of a pilot valve 34, thereby continuously establishing in the pipe 35 a loading pressure representative of a brilliancy factor within the furnace 1.

Within the pipe 35 is a throttle valve 36. The loading pressures within the pipes 30 and 35 are applied to opposing chambers of an averaging relay 37, which may be of the type described and claimed in the Dickey Patent 2,098,913. A control pressure is continuously established within a pipe 38, the resultant of the pressures applied to the averaging relay 37. The throttle valve 36 is so adjusted as to vary the relative effect of the loading pressure from the brilliancy measure. In other words, I may so adjust the system that the loading pressure within the pipe 38 is a composite of 80% steam flow effect and 20% brilliancy effect, or I may vary the relative effect of the two controls as desired. As previously mentioned, the primary control is in accordance with the continuous measure of B. t. u. demand upon the unit modified by an indication of brilliancy within the furnace 1, which is indicative of variations in moisture content, volatility, B. t. u. content, etc., of the fuel being supplied.

The control pressure established in the pipe 38 is applied to a pneumatic controller 39 for positioning the rheostat 8, thereby controlling the speed of the feeder screw 6 and consequently the volumetric rate of supply of raw fuel to the furnace 1. Superimposed in the pipe 38 is a selector valve 40 similar to the selector valve 27 and allowing manual control of the rheostat 8 if desired.

In general, I provide a control of induced draft to maintain furnace draft value as desired. The supply of air for combustion is under the control of vapor outflow pressure. The volumetric rate of supply of hog fuel to the furnace is continuously proportioned to the vapor outflow rate and is continuously modified in accordance with a measure of brilliancy within the furnace. Thus I primarily proportion the B. t. u. input to the furnace to the B. t. u. demand upon the unit but through the modifying or readjusting control from brilliancy I take into account variations in the fuel, such as moisture content, B. t. u. content and the like which would otherwise make slightly incorrect the volumetric measure of B. t. u. supplied to the furnace.

In Fig. 2 I show a modified control wherein the brilliancy sight is aimed to be directly responsive to brilliancy of the cone surface.

While I have described the arrangements of Figs. 1 and 2 in connection with the burner of hog fuel, bagasse and similar materials, it will be evident that the control of combustion from a measure of brilliancy is not limited thereto, but finds useful application in combination with apparatus for burning other fuels, such as coal or coke in a fuel bed or fluid fuels forced into a furnace. By fluid fuels I intend to include such fuels as pulverized coal, oil, gas, blast furnace gas, black liquor, and the like.

In Fig. 3 I indicate a furnace having a solid fuel bed 43 of coal upon a grate 44 to the underside of which is applied forced draft. The brilliancy sight 33 may be sighted at the surface of the fuel bed, the flame and gases leaving the fuel bed, or at the wall of the furnace as desired. From such a measure of brilliancy I may control the rate of fuel supply to the bed.

Referring now to Fig. 4, I show therein a furnace for the reduction and smelting of black liquor, or in general to the treatment of waste liquors from chemical methods of treating wood or like material in the production of pulp or paper, and is particularly directed to the recovery of chemical and heat values from such liquors. In the treatment of cellulosic materials for the production of pulp, particularly by alkali chemical methods, the waste liquors usually known as black liquor, contain valuable chemical and heat generating constituents, the recovery of which is of great economic importance. After certain evaporative operations the concentrated liquor is usually sprayed into the smelting furnace, on the bottom of which the black ash is burned by the introduction of air, and excess air introduced completes the oxidization or combustion of any gases not completely oxidized in the smelting zone. The heat thus generated, causes the vaporization of the liquor and the completely burned hot gases thus formed have been used for the generation of steam and like purposes.

Referring to Fig. 4, the concentrated liquor is sprayed in the usual manner through the wall of the furnace as at 45. There may be one or more spray nozzles, and these are preferably directed, at least in part, against the walls of the furnace so that the walls are coated in varying degree by liquid, sludge, and finally by partially dried fragments 46 which collect and eventually drop to the bottom of the furnace, forming a semi-plastic bed 47. The bottom of the furnace is usually sloped to an outlet 48 from which the chemicals are recovered. The brilliancy sight tube 33 is located in the furnace wall and may be directed to look at the walls of the furnace, or at the surface of the bed 47. In general, the arrangement provides a control of the rate of supply of liquor through the sprayers 45 in accordance with brilliancy, for it is known that too great a rate of liquid supply will result in a cooling of the walls and furnace and a smothering or flooding of combustion therein. Such a dark or cool furnace, of course, decreases the rate of heat liberation and consequently the rate of heat available for production of steam or other usage. I have found that an indication of brilliancy at a selected location within the furnace is the best criterion of operation within the furnace.

In Fig. 5 I indicate that a furnace may be supplied with a gaseous or fluid fuel through one or more burners 49. The burner or burners may be located in common manner and may supply such fluid fuels as pulverized coal, blast furnace gas, oil, or the like. The brilliancy sight 33 may be directed across the flame or at one of the furnace walls as found most advantageous, and the measure of brilliancy utilized in control of the air-fuel mixture.

It is a principal object of my invention to incorporate the combustion variable brilliancy in a control of one or more of the elements of combustion, and such method may be accomplished through a manual control of the element or elements of combustion from an observation of a brilliancy meter and of other meters as disclosed, or it may be accomplished automatically.

While I have disclosed and described certain preferred embodiments of my invention, it is to be understood that I do this by way of example only and not in a limiting manner.

What I claim as new and desire to secure by Letters Patent of the United States is:

1. The method of operating a hog fuel fired vapor generator heated by products of combustion occurring in a furnace, comprising forming a conical bed of said fuel, supplying fuel to the top portion of said bed, separately and continuously supplying air for combustion to the furnace beneath said bed, continuously controlling the discharge of the products of combustion from the furnace responsive to draft through the furnace, continuously controlling the supply of air for combustion responsive to the pressure of the generated vapor, continuously determining the brilliancy of the surface of said conical bed, continuously determining the rate of flow of generated vapor, continuously controlling the rate of fuel supply primarily in accordance with the rate of flow of generated vapor by increasing the rate of fuel supply as the flow of generated vapor increases, and continuously modifying the controlling of the rate of fuel supply in accordance with said determination of brilliancy to maintain a predetermined standard and in a direction tending to reduce the rate of fuel supply as the brilliancy decreases from said predetermined standard, and vice versa.

2. The method of operating a hog fuel fired vapor generator heated by products of combustion occurring in a furnace, comprising forming a conical bed of said fuel, supplying fuel to the top portion of said bed, separately supplying air for combustion to the furnace beneath said bed, continuously controlling the supply of air for combustion responsive to the pressure of the generated vapor, continuously determining the brilliancy of the combustion about the outer surface of said conical bed, determining the rate of flow of generated vapor, controlling the rate of fuel supply primarily in accordance with the rate of flow of generated vapor to increase the rate of fuel supply as the flow of generated vapor increases, and continuously modifying the controlling of the rate of fuel supply in accordance with said determination of brilliancy to maintain a predetermined standard and in a direction to reduce the rate of fuel supply as the brilliancy decreases, and conversely.

3. Apparatus for controlling the operation of a hog fuel fired vapor generator, comprising in combination, a furnace provided with grates adapted to burn hog fuel, feed means continuously discharging such fuel downwardly into the furnace and on to the grates at a variable rate to build a cone shaped fuel bed, means supplying air for combustion to the furnace beneath the grates, means continuously responsive to vapor outflow pressure to continuously regulate the means supplying air for combustion, a device continuously responsive to rate of vapor outflow from the generator, brilliancy responsive means including a brilliancy sight arranged to see the brilliancy of combustion about the outer surface of said fuel and a brilliancy meter continuously responsive to said sight, and means continuously actuated by said vapor outflow responsive device to increase the rate of fuel discharged by said feed means as the flow of generated vapor increases, said continuously actuated means being conjointly and continuously actuated by said brilliancy responsive means in a direction to reduce said rate of fuel discharged as the brilliancy decreases from a predetermined standard, and conversely.

HAROLD T. SAWYER.

REFERENCES CITED

The following references are of record in the file of this patent:

UNITED STATES PATENTS

| Number | Name | Date |
| --- | --- | --- |
| Re. 19,592 | Gibson | May 28, 1935 |
| 1,338,928 | Hopwood | May 4, 1920 |
| 1,471,342 | Logan | Oct. 23, 1923 |
| 1,729,701 | Bennett | Oct. 1, 1929 |
| 1,906,244 | Benjamin | May 2, 1933 |
| 2,143,820 | Payn | Jan. 10, 1939 |

OTHER REFERENCES

Volbrath, pages 15, 16 and 17 of "Instrumentation," October and November issue, 1945, published by Brown Instrument Company, Philadelphia, Pennsylvania.